(12) United States Patent
Fenton et al.

(10) Patent No.: US 10,346,832 B2
(45) Date of Patent: *Jul. 9, 2019

(54) CARD PAYMENT SYSTEM TEST SUPPORT APPARATUS AND METHOD OF USE

(71) Applicant: Walmart Apollo, LLC, Bentonville, AR (US)

(72) Inventors: Timothy M. Fenton, Bentonville, AR (US); Christopher D. Johnson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,730

(22) Filed: Oct. 15, 2018

(65) Prior Publication Data

US 2019/0050848 A1 Feb. 14, 2019

Related U.S. Application Data

(63) Continuation of application No. 15/816,800, filed on Nov. 17, 2017, now Pat. No. 10,134,027.

(60) Provisional application No. 62/424,694, filed on Nov. 21, 2016.

(51) Int. Cl.
*G07G 1/00* (2006.01)
*G07G 1/12* (2006.01)
*G06Q 20/34* (2012.01)

(52) U.S. Cl.
CPC ......... *G06Q 20/341* (2013.01); *G07G 1/0018* (2013.01); *G07G 1/12* (2013.01)

(58) Field of Classification Search
None
See application file for complete search history.

(56) References Cited

U.S. PATENT DOCUMENTS

| 3,795,805 A | 3/1974 | Swanberg |
| 4,811,387 A | 3/1989 | Hollewed |
| 5,019,696 A | 5/1991 | Chang |

(Continued)

OTHER PUBLICATIONS

PCT; App. No. PCT/US2017/061239; International Search Report and Written Opinion dated Jan. 30, 2018.

(Continued)

*Primary Examiner* — Kristy A Haupt
(74) *Attorney, Agent, or Firm* — Fitch, Even, Tabin & Flannery LLP (57) ABSTRACT

In some embodiments, apparatuses and methods are provided to support the testing of card interface systems. Some embodiments provide apparatuses to support a card payment system during robotic testing, comprising: a frame configured to cooperate with the separate card payment system; a card chip guide extending from the frame and comprising a first and second card contact surfaces extending from the frame at a first position such that interior ends of the first and second card contact surfaces are configured to align with a card slot of the card payment system; and a card strip guide extending from the frame and comprises third and fourth card contact surfaces that taper with an alignment slot separating the third and fourth card contact surfaces, wherein the alignment slot is configured to align with a card slide of the card payment system when the card payment system is cooperated with the frame.

20 Claims, 6 Drawing Sheets

(56) References Cited

U.S. PATENT DOCUMENTS

| | | |
|---|---|---|
| 5,105,073 A | 4/1992 | Kovach |
| 5,308,959 A | 5/1994 | Cherry |
| 5,321,243 A | 6/1994 | Groves |
| 5,438,186 A | 8/1995 | Nair |
| 5,811,770 A | 9/1998 | Bonnemoy |
| 6,019,623 A | 2/2000 | Ito |
| 6,042,010 A | 3/2000 | Kanayama |
| 6,179,209 B1 | 1/2001 | Goodwin |
| 6,186,402 B1 | 2/2001 | Johnson |
| 6,474,550 B1 | 11/2002 | Caridas |
| 6,527,187 B1 | 3/2003 | Nagata |
| 6,719,199 B1 | 4/2004 | Cotten |
| 7,100,819 B1 | 9/2006 | Green |
| 9,203,548 B2 | 12/2015 | Ray |
| 9,224,018 B1 | 12/2015 | Nguyen |
| 10,134,027 B2 * | 11/2018 | Fenton et al. ......... G06Q 20/34 235/483 |
| 2003/0094488 A1 | 5/2003 | Tanaka |
| 2008/0091601 A1 | 4/2008 | Green |
| 2015/0317498 A1 | 11/2015 | Gustafsson |
| 2016/0034723 A1 | 2/2016 | Somani |
| 2016/0300456 A1 | 10/2016 | Zong |

OTHER PUBLICATIONS

Swivel Stands; "Swivel Stands Credit Card Stand Horizontal Pocket Verifone 1000SE"; https://www.swivelstands.com/swivel-stands-credit-card-stand-horizontal-pocket-verifone-1000se/; Available at least as early as Apr. 29, 2016; pp. 1-3.

Thingiverse; "iPhone 5/5S and iPod 5th Gen Stand—Horizontal"; https://www.thingiverse.com/thing:164520; Oct. 12, 2013; pp. 1.

Thingiverse; "PS4 Stand Horizontal with game holder"; https://www.thingiverse.com/thing:1157014; Nov. 26, 2015; pp. 1.

UL Transaction Security; "UL Terminal Test Station"; https://www.youtube.com/watch?v=23a9iavWH3o; Sep. 2, 2016; pp. 1-9.

U.S. Appl. No. 15/816,800; Notice of Allowance dated Jul. 18, 2018.

\* cited by examiner

CARD PAYMENT SYSTEM TEST SUPPORT APPARATUS AND METHOD OF USE

CROSS-REFERENCE TO RELATED APPLICATION

This application is a continuation of U.S. application Ser. No. 15/816,800, filed Nov. 17, 2017, which claims the benefit of U.S. Provisional Application No. 62/424,694, filed Nov. 21, 2016, which is incorporated herein by reference in its entirety.

TECHNICAL FIELD

This invention relates generally to physically supporting systems while being tested.

BACKGROUND

There are many types of retail payment machines. These machines are repeatedly used over time by numerous customers. The reliability and consistency of these machines is critical to customer satisfaction and completing sales. Accordingly, there is a need to ensure the reliability of these machines and their use.

BRIEF DESCRIPTION OF THE DRAWINGS

Disclosed herein are embodiments of systems, apparatuses and methods to support a system while being robotically tested. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to support an electronic test system that is to be repeatedly tested by a robot testing system. The test system support apparatus can support a credit card payment system, a gift card payment system, card access system, and/or other such card receiving systems that are configured to physically receive at least a portion of a card and perform one or more functions based on the card, such as confirm an identification of the card and/or a user of the card, obtain an authorization, obtain account information, obtain billing information, and/or other such information. The below is generally described with reference to a test system support apparatus configured to position and support a card payment system (e.g., credit card payment system to be used at retail shopping facilities); however, the test system support apparatus can be utilized with other relevant card systems that are configured to physically interact with cards. The support apparatus can in part support a card payment system during robotic testing of the card payment system.

In some embodiments, system support apparatus includes a frame that is configured to cooperate with the separate card payment system, and includes one or more card guides positioned relative to card inputs of the card payment system. In some instances, the system support apparatus has a card chip guide extending from the frame and comprising a first and second card contact surfaces. The card chip guide extends from and is secured with the frame at a first position such that interior ends of the first and second card contact surfaces are configured to align with a card slot of the card payment system when the card payment system is cooperated with the frame. The system support apparatus may include a card strip guide extending from the frame having first and second card strip contact surfaces that taper from a slide opening to an alignment slot separating the first and second card strip contact surfaces. The alignment slot is positioned at a second position separate from the first position such that the alignment slot is configured to align with a card slide of the card payment system when the card payment system is cooperated with the frame.

Figure 1:
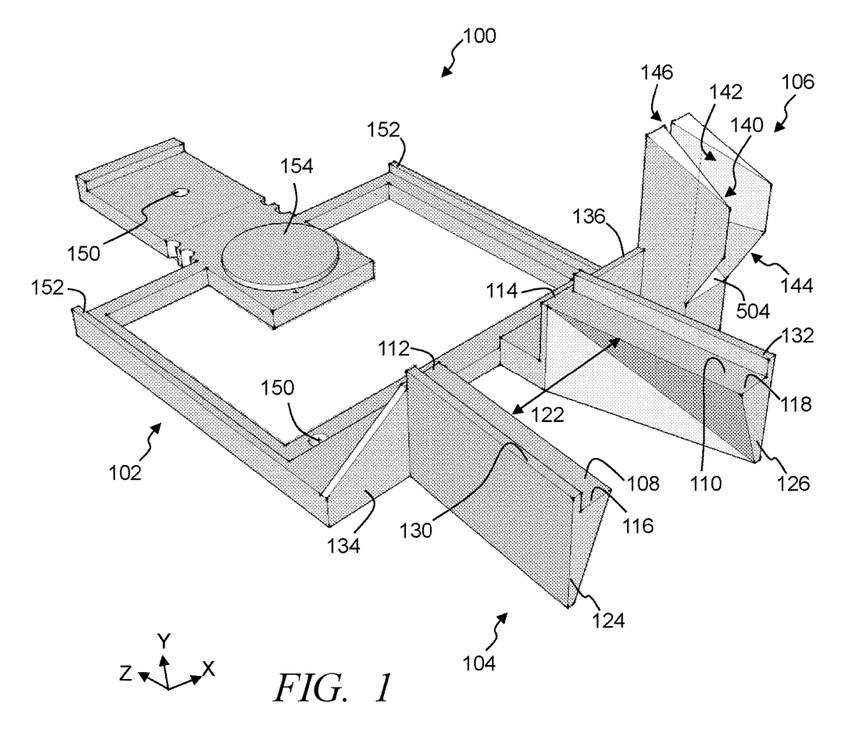
FIGS. 1-3 illustrate simplified perspective views of an exemplary test system support apparatus, in accordance with some embodiments.
Figure 2:
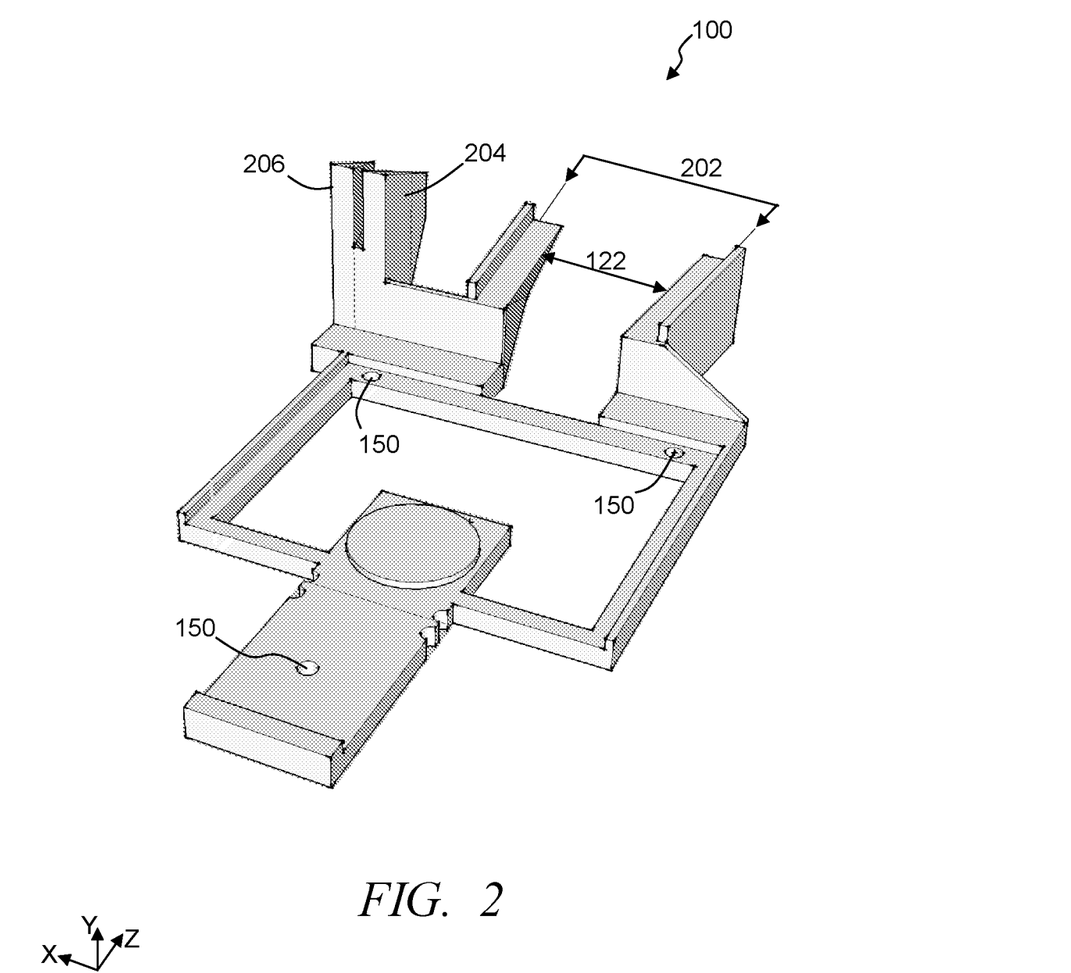
Figure 3:
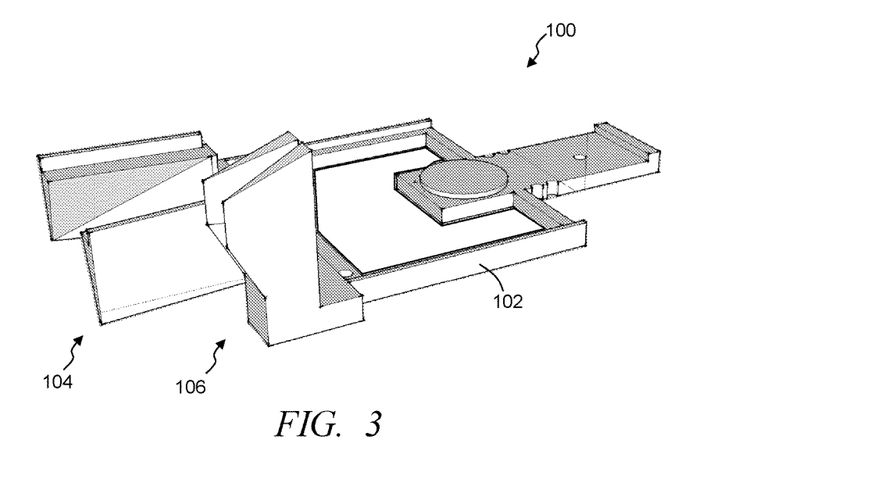
Figure 4:
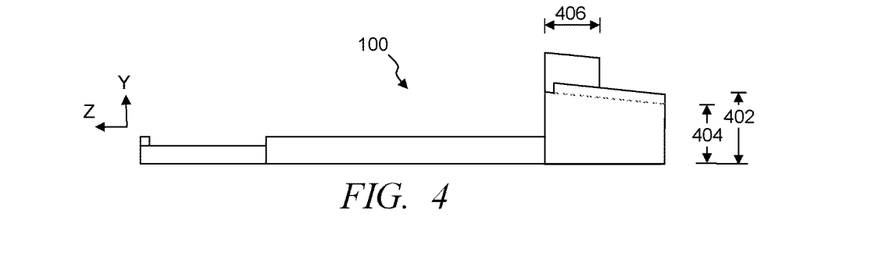
FIG. 4 illustrates a simplified side, plane view of an exemplary support apparatus, in accordance with some embodiments.
Figure 5:
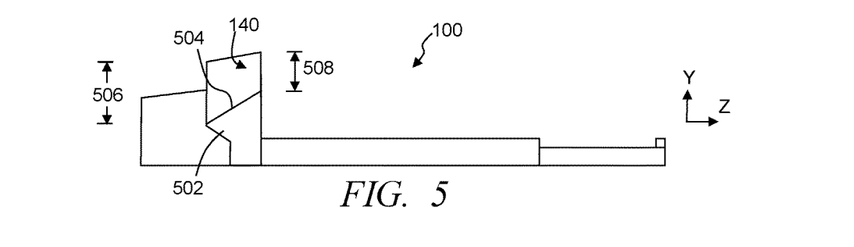
FIG. 5 illustrates a simplified, cross-sectional view of an exemplary support apparatus, in accordance with some embodiments.
Figure 6:
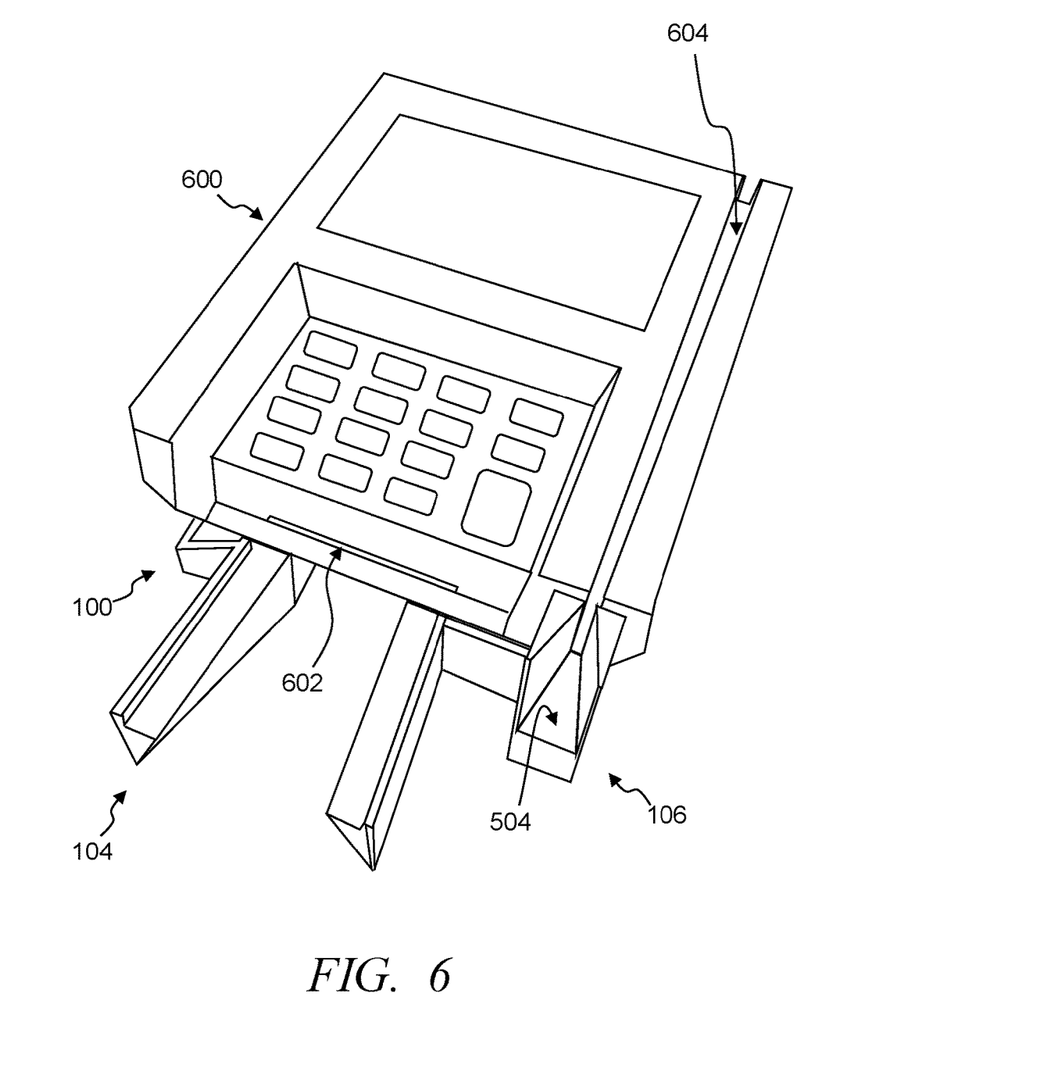
FIG. 6 illustrates a simplified perspective view of an exemplary support apparatus cooperated with an exemplary test card payment system, in accordance with some embodiments.

FIGS. 1-3 illustrate simplified perspective views of an exemplary test system support apparatus 100 from different viewing angles, in accordance with some embodiments. FIG. 4 illustrates a simplified side, plane view of an exemplary support apparatus 100, in accordance with some embodiments. FIG. 5 illustrates a simplified, cross-sectional view along a strip card channel of an exemplary support apparatus 100, in accordance with some embodiments. FIG. 6 illustrates a simplified perspective view of an exemplary support apparatus 100 cooperated with an exemplary test card payment system 600, in accordance with some embodiments. Referring to FIGS. 1-6, the support apparatus 100 includes a frame 102 that is configured to cooperate with a separate card payment system, and typically to at least partially support a card payment system. The frame can be configured with dimensions to correspond to the dimensions of the card payment system. In other implementations, the frame is configured to secure with a mounting plate that secures with a card payment system. In some embodiments, the support apparatus 100 includes a card chip guide 104 that extends from the frame 102 at a first position which is typically dependent on a position of a chip card slot 602 of the test card payment system. Additionally or alternatively, the support apparatus in some embodiments include a card strip guide 106 that extending from the frame.

The card chip guide 104 includes a first card contact surface 108 and a second card contact surface 110 that are configured with interior ends 112, 114 that are closer to the frame than distal ends 116, 118 of the first and second card contact surfaces, respectively. The first and second card contact surfaces 108, 110 are configured to align with a chip card slot of a card payment system when the card payment system is cooperated with the frame. In some embodiments the card chip guide comprises first and second cantilevers 124, 126 extending generally away from the frame 102. The first and second card contact surfaces 108, 110 are defined along at least portions of a length of the first and second cantilevers, respectively. The first and second cantilevers may extend from the frame at approximately 90 degrees, while in other implementations, the first and second cantilevers may extend from the frame at angles such that the separation distance 122 between the first and second cantilevers increases further from the frame (i.e., the separation distance 122 is shorter closer to the frame, and longer further from the frame).

Further, in some implementations, the first card contact surface 108 is separated from the second card contact surface by at least a distance 122, and typically by at least by a robotic holder or effector threshold distance. The separation between the first and second card contact surfaces 108, 110, and/or the first and second cantilevers 124, 126 enables a robotic holder (e.g., end effectors, suction system, etc.) of a robot system supporting a test payment card to move between the first and second contact surfaces, and in some instances between the first and second cantilevers, while moving the test payment card toward at chip card slot of the test card payment system. The separation allows the end effectors to at least partially be positioned between the first and second card contact surfaces without contacting the card chip guide 104 and moving the test payment card toward the chip card slot of a test payment system. In other embodiments, the card chip guide may be formed from a single piece of material and/or with the cantilevers joined with an end effector channel formed in the card chip guide separating at least the first and second card contact surfaces and having at least an end effector threshold depth that enables the end effectors or other holder to move the test payment card toward the chip card slot.

In some embodiments, the first and second card contact surfaces are aligned along a plane 202. As such, a test payment card spans the separation of the card contact surfaces and can be slid along some or all of the length of the card contact surfaces. The card contact surfaces are further orientation such that the planar arrangement aligns the card contact surfaces with the card chip slot of the card payment system.

Typically, the robot holder moves the test payment card along at least a portion of a length of the first and second card contact surfaces toward the test card payment system cooperated with the frame, and in some instances, the robot system utilizes the alignment of the interior ends 112, 114 of the first and second contact surfaces and causes the test card to contact the first and second contact surfaces as the test payment card approaches the chip card slot. The first and second contact surfaces provide guidance of the test payment card and the robot system to accurately align the test payment card with the chip card slot of the test card payment system. In some instances, the first and second card contact surfaces 108, 110 are marginally elevated relative to the chip card slot, and the robot system can slide the test payment card along at least a portion of the length of the card contact surfaces such that the end of the card slides directly into the chip card slot.

As described above, the first and second card contact surfaces 108 and 110 are separated by the separation distance 122. In some instances, the first cantilever 124 is separated from the second cantilever 126 by at least the robotic effector threshold distance. The separation of the first and second cantilevers enables robot effectors or other holders to move in-between the first cantilever and the second cantilever at least along a portion of the length of the first and second cantilevers. In some embodiments, the separation distance 122 between the first and second card contact surfaces and along at least a portion of and typically all of the length of the first and second card contact surfaces, however, is further configured to be less than a width of a test payment card intended to be used in testing a card payment system. As such, the card contact surfaces support a test payment card upon contact with one or both of the card contact surfaces and inhibits the test payment card from moving beyond or below a plane (representatively labeled 202 in FIG. 2) defined by and extending across the first and second card contact surfaces.

In some implementations, the card chip guide 104 includes a first guide wall 130 extending from and defining an outer boundary of the first card contact surface, and a second guide wall 132 extending from and defining an outer boundary of the second card contact surface. The distance between the first and second guide walls is greater than the separation distance 122 between the first and second card contact surfaces 108, 110. Further, the distance between the first and second guide walls is greater than or equal to a width of a test payment card expected to be utilized with the support apparatus 100. In some embodiments, the first and second guide walls 130, 132 are arranged at angles such that the distance between the first and second guide walls proximate the interior ends 112, 114 of the card contact surfaces is less than the distance between the first and second guide walls proximate the distal ends 116, 118 of the first and second card contact surfaces. Further, the distance between the first and second guide walls proximate the interior ends of the card contact surfaces is equal to or marginally greater than a width of an expected test payment card (e.g., typically less than 15% greater than the width of the test payment card, and in some implementations less than 5% greater than the width of the test payment card). In some embodiments, the distance between the first and second guide walls proximate the interior ends of the card contact surfaces is configured to be substantially equal to or less than a width of an input opening of a chip card slot 602 of one or more preselected test card payment systems, while still being wider than at least one preselected test payment card, and positioned to align with the chip card slot when the preselected test card payment system is cooperated with the frame 102.

The first and second guide walls 130, 132 have a height above the card contact surfaces. The height is typically greater than a thickness of one or more predefined test payment cards expected to be utilized with the support apparatus. Further, the height may vary depending on one or more factors, such as but not limited to a type of test payment card expected to be used, determined robot inconsistencies in movement precision, ranges of allowable error in movement of the robot end effectors, expected rate of speed of movement of the robot end effectors, and/or other such factors.

Further, in some embodiments, the first and second card contact surfaces may slope and be angled relative to a height (e.g., along a Z-axis as illustrated in FIGS. 1 and 4). Accordingly, a height 402 of the first and second card contact surfaces proximate the interior ends 112, 114 is greater than a height 404 of the first and second card contact surfaces proximate the distal ends 116, 118. In other instances, the cantilevers 124, 126 may be formed at an angle relative to the frame providing the first and second contact surfaces at the desired angle. The angle of the first and second contact surfaces can provide a gradual contact of the test payment card onto one or both of the first and second contact surfaces as the robot end effectors are moving the test payment card toward the chip card slot of a test card payment system.

The first and second cantilevers 124, 126 are formed with sufficient rigidity and stability to withstand the repeated contact of payment cards on the card contact surfaces as the robot end effectors of the test system contact and guide the test cards along at least a portion the card contact surfaces. In some instances, the thickness of the first and second cantilevers may be formed to taper along a height. For example, the first and/or second cantilevers 124, 126 of the card chip guide 104 may tapered along at least a portion of its height and along at least a portion of its length. Some embodiments, however, do not include tapering of the cantilevers. This reduction in thickness can reduce an amount of material used in manufacturing the support apparatus 100. Further, some embodiments may include one or more lateral supports 134, 136 cooperated with the first and/or second cantilevers 124, 126. The lateral supports may, in part provide added stability to the card contact surfaces. Additionally or alternatively, the lateral supports may be configured to provide a boundary for placement of the payment system to be tested when cooperated with the support apparatus 100. In some instances, one or more lateral supports 136 may extend between one of the cantilevers and the card strip guide 106.

In some embodiments, the card strip guide 106 is secured with and/or extends from the frame and includes a first strip card contact surface 140 and second strip card contact surface 142. Further, in some implementations, the card strip guide is integral with the frame and formed with the frame. As described above, the card strip guide includes the first strip card contact surface 140 and the second strip card contact surfaces 142. The first strip card contact surface 140 is separated from the second strip card contact surface 142 defining a strip card channel. In some implementations, the first and second strip card contact surfaces extend between a slide opening 144 and an alignment slot 146. The alignment slot is proximate the frame 102 and the slide opening 144 is distant from the frame by at least a length 406 of the strip card channel. Similarly, the alignment slot 146 is positioned to be adjacent a card payment system when the card payment system is cooperated with the frame 102 with the slide opening 144 distant from the card payment system by a length 406 of the card strip guide 106.

Typically, the slide opening 144 is configured to be wider than the alignment slot 146. Accordingly, the first and/or second strip card contact surfaces may be formed at angles relative to each other and a central axis of the card strip guide, and taper from the slide opening 144 to the alignment slot 146. Further, in some instances, the first strip card contact surface 140 tapers from the slide opening to the alignment slot and toward the second strip card contact surface 142, and the second strip card contact surface tapers toward the first strip card contact surface such that the slide opening width is greater than an alignment slot width of the alignment slot 146. The alignment slot is positioned at a position relative to the frame that is separate from the position of the card chip guide 104 such that the alignment slot is configured to align with a card slide 604 of the card payment system when the card payment system is cooperated with the frame 102, and which is separated by a distance from the position of the chip card slot of the test card payment system. The amount of taper of the first and second strip card contact surfaces is dependent on the length 406 of the card strip guide and the desired size of the slide opening 144. In some instances, the width of the slide opening 144 is twice the width of the alignment slot 146, and often three or more times the width of the alignment slot.

In some embodiments, the card strip guide includes a strip guide base 502 and a first wall 204 and a second wall 206 that each extend from the strip guide base. The first wall 204 comprises the first strip card contact surface 140, and the second wall 206 comprises the second strip card contact surface 142 positioned opposite the first strip card contact surface with the first strip card contact surface separate and spaced from the second strip card contact surface. Further, in some implementations, the strip guide base 502 comprises a ramp surface 504 that inclines along at least a portion of a length of the ramp surface and/or the strip guide base such that a slide opening height 506 is greater than an alignment slot height 508. The height or depth of the strip card channel of the card strip guide can be limited to being less than an effector threshold height. The limited height of the strip card channel prevents the card strip guide 106, while guiding a test payment card, from contacting robotic effectors as robotic effectors slide the test payment card through the card strip guide and along the card slide 604 and a card strip reader of the card payment system.

Further, in some embodiments the frame 102 can include one or more alignment structures configured to align with corresponding structures of a mounting plate and/or a payment system 600. For example, some embodiments include mounting plate coupling apertures 150 configured to align with mounting apertures of a mounting plate that is configured to mate with multiple different types of card payment systems such that the frame is configured to be positioned between the mounting plate and a mounting post. Additionally or alternatively, the frame may include one or more frame rails 152 that align the payment system and/or mounting plate. Some embodiments may include one or more alignment projections 154 configured to align with one or more alignment structures of the payment systems and/or the mounting plate. In some embodiments, the frame 102 may include one or more open areas that may reduce an amount of material used to manufacture the support apparatus 100 and/or may enable a portion of the payment system to extend through the one or more open areas. Further, the open areas, may in part provide ventilation for the payment system.

The support apparatus 100 can be constructed from substantially any relevant material having the structural integrity to support a test system and provide one or both of the card chip guide and the card strip guide 106 for one or more different payment authentications (e.g., magnetic strip payment authentication method, card chip authentication method, etc.). For example, the card grip apparatus may be constructed from polylactic acid (PLA), acrylonitrile butadiene styrene (ABS), plastics, carbon fiber impregnated PLA, rubber, silicon, aluminum, other metals, other such materials, or combination of two or more of such materials. In some instances, some or all of the support apparatus may be formed from layering of materials cooperatively merge forming the portions or all of the card grip apparatus. Further, in some embodiments, the support apparatus 100 or portions of the support apparatus can be formed through three-dimensional (3D) printing processes. In other implementations, the support apparatus or portions of the support apparatus may be manufactured through injection molding, machining, other such methods, or combination of two or more of such methods.

Figure 7A:
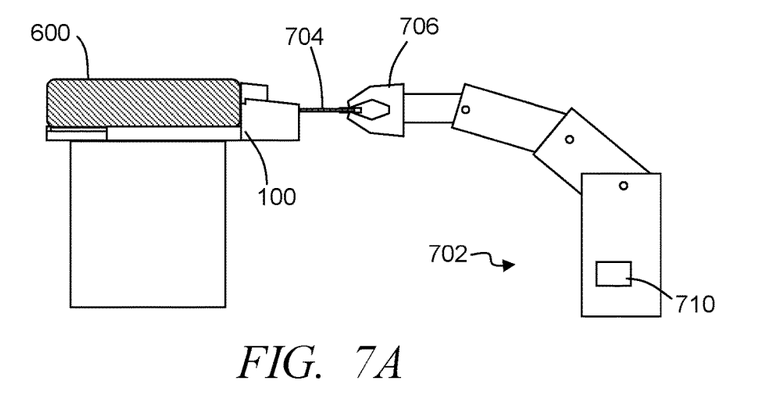
FIGS. 7A and 7B illustrate a simplified block diagram of an exemplary test system support apparatus cooperated with a test payment system, and a testing robot system in testing the payment system, in accordance with some embodiments.
Figure 7B:
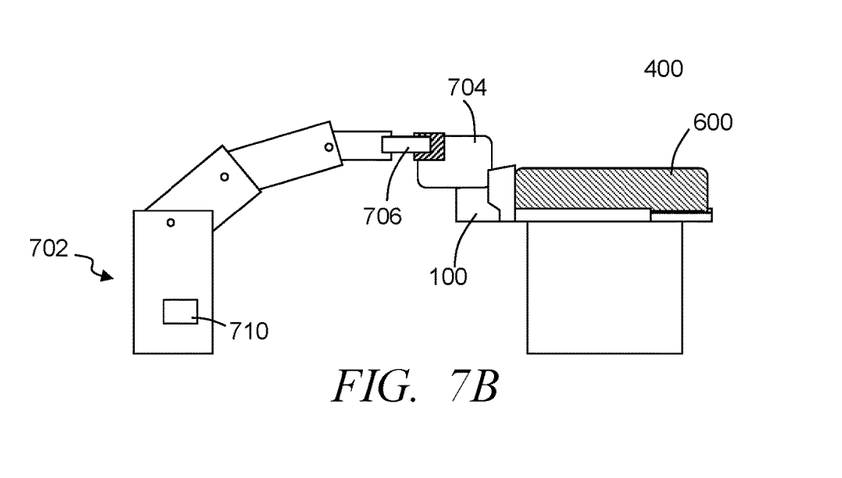

FIGS. 7A and 7B illustrate a simplified block diagram of an exemplary test system support apparatus 100 cooperated with a test payment system 600, and a testing robot system 702 clamping and supporting a test payment card 704 to be used in testing the payment system 600, in accordance with some embodiments. The test robot system is positioned proximate the test payment system to be tested. In operation, the testing robot system can control one or more robotic holders 706 (e.g., the robotic end effectors) to hold the test payment card. As illustrated in FIG. 7A, the testing robot system can position the test payment card relative to the card chip guide 104 (e.g., with the test payment card orientated such that a face of the test payment card contacts one or both of the first and second card contact surfaces 108, 110), such that the card chip guide can assist in guiding the test payment card into the chip card slot 602. As illustrated in FIG. 7B, the testing robot system can position the test payment card relative to the card strip guide 106 (e.g., with the test payment card orientated such an edge of the test payment card can contact the strip guide base 502 and/or one or both of the faces of the test payment card can contact one or both of the first and second guide walls 130, 132), such that the card strip guide can assist in guiding the test payment card into the card slide 604 of the test payment system 600.

The test robot system typically includes one or more robot control systems 710 that controls at least the end effectors 706 and movement to cause the test payment card to be inserted into the chip card slot and/or the card slide. Additionally or alternatively, the test robot is in wired and/or wireless communication with a control system at a remote location and that provides at least some control and/or programming to the robot control system. The test robot can, for example, be controlled to insert the test payment card into a payment and/or authentication slot, swipe an authentication strip along a magnetic strip reader groove, and/or other such testing.

The support apparatus 100 repeatedly guides the test payment card into a consistent position to allow repeated testing of the test payment system. Further, the card chip guide 104 and/or the card strip guide 106 allows a margin of error of the positioning by the testing robot system while still accurately aligning the test payment card with the chip card slot and/or the card slide.

Figure 8:
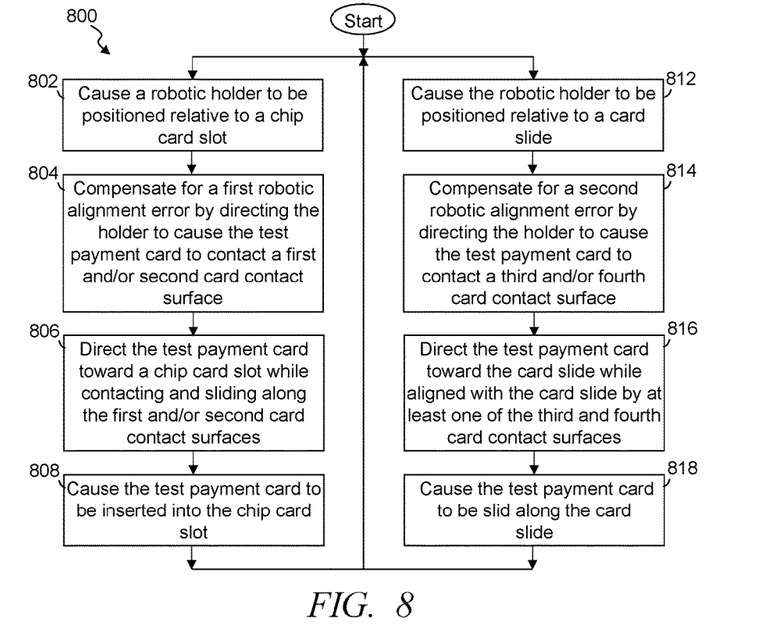
FIG. 8 illustrates a simplified flow diagram of an exemplary process of testing a card payment system, in accordance with some embodiments.

FIG. 8 illustrates a simplified flow diagram of an exemplary process 800 of testing a card payment system 600, in accordance with some embodiments. The process enables the repeated testing of one or both of a chip reader system of a card payment system and a card strip reader system of a card payment system. In step 802, one or more robotic holders, transporting a test payment card, are caused to be positioned relative to a chip card slot 602 of the card payment system 600. In step 804, a first robotic alignment error is compensated for by, in part, directing the holder to cause the test payment card to contact a first card contact surface 108 and a second card contact surface 110 of a card chip guide 104 of a card payment system support apparatus 100. In step 806, the test payment card is directed toward a chip card slot while contacting and sliding along the first and second card contact surfaces. In step 808, the test payment card is caused to be inserted into the chip card slot that is aligned with interior ends 112, 114 of the first and second card contact surfaces. Two or more of steps 802, 804, 806 and 808 may be repeated any number of times to repeatedly test the card payment system.

As described above, some embodiments additionally or alternatively repeatedly test a card strip reader of a card payment system. In step 812, the robotic holder is caused to be positioned relative to a card slide of the card payment system. In step 814, a second robotic alignment error is compensated for by, in part, directing the holder to cause the test payment card to contact at least one of a first strip card contact surface 140 and a second strip card contact surface 142 a card strip guide 106 of the card payment system support apparatus 100. In step 816, the test payment card is directed toward a card slide 604 while being aligned with the card slide by at least one of the first and second strip card contact surfaces. In step 818, the test payment card is caused to be slid along the card slide. The card may contact and/or slide along one or both of the first and/or second strip card contact surfaces as the card is moved along the strip card channel toward and into the card slide 604. In some instances, two or more of the steps 812, 814, 816 and 818 may be repeated any number of times to repeatedly test the card payment system. Similarly, the process may optionally alternate between testing the chip card slot system of the card payment system and the card slide system of the card payment system.

As described above, the card chip guide 104 may include cantilevers 124, 126. In at least some implementations, at least portions of the cantilevers may be separated to allow at least portions of the card holder to move between the cantilevers. In directing the test payment card toward the chip card slot, some embodiments cause the test payment card to be inserted into the chip card slot while causing the robotic holder to move between a first cantilever 124 that comprises the first card contact surface 108 and a second cantilever 126 that comprises the second card contact surface 110. Further, some embodiments compensate for a first perpendicular robotic alignment error that is perpendicular to the first robotic alignment error through contact with at least one of a first guide wall 130 and a second guide wall 132. The first guide wall 130 can be configured to extend from and define an outer boundary of the first card contact surface 108, and the second guide wall 132 can be configured to extend from and define an outer boundary of the second card contact surface 110. In some instances, the card strip guide 106 further enables the compensation for a second perpendicular robotic alignment error that is perpendicular to the second robotic alignment error through contact with a ramp surface of the strip guide base 502. The ramp surface inclines along at least a portion of a length of the ramp surface and/or the strip guide base such that the slide opening height 506 is greater than an alignment slot height 508.

Figure 9:
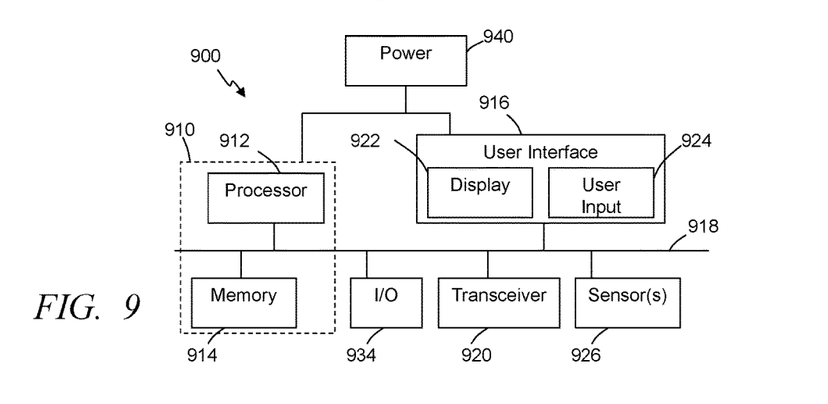
FIG. 9 illustrates an exemplary system for use in implementing methods, techniques, devices, apparatuses, systems, servers, sources and testing systems, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing any of the components, circuits, circuitry, systems, functionality, apparatuses, processes, or devices of the testing robot system 702, one or more remote testing control systems in communication with the testing robot system, one or more of the payment systems, and/or other above or below mentioned systems or devices, or parts of such circuits, circuitry, functionality, systems, apparatuses, processes, or devices. For example, the system 900 may be used to implement some or all of the robot control system 710, remote robot control system, the card payment system 600, and/or other such components, circuitry, functionality and/or devices. However, the use of the system 900 or any portion thereof is certainly not required.

By way of example, the system 900 may comprise a control circuit or processor module 912, memory 914, and one or more communication links, paths, buses or the like 918. Some embodiments may include one or more user interfaces 916, and/or one or more internal and/or external power sources or supplies 940. The control circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like. For example, the system may implement the robot control systems 710 with the control circuit being a robot control circuit, the card payment system 600 with a card payment control circuit, or other components.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component, such as a central control system. The sensors can include substantially any relevant sensor, such as distance measurement sensors (e.g., optical units, sound/ultrasound units, etc.), applied forces, end effector clamping force, inertial sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor readable and/or computer readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

In some embodiments, an apparatus and a method enhance the testing of interfaces of electronic systems, such as card payment systems, card security systems, card access systems, and/or other such systems. Some embodiments provide apparatuses to support a system, such as a card payment system, during robotic testing. These apparatuses can include a frame configured to cooperate with the separate card payment system; a card chip guide extending from the frame and comprising a first card contact surface and a second card contact surface, wherein the card chip guide extends from and is secured with the frame at a first position such that interior ends of the first and second card contact surfaces are configured to align with a card slot of the card payment system when the card payment system is cooperated with the frame; and a card strip guide extending from the frame and comprises third and fourth card contact surfaces that taper from a slide opening to an alignment slot separating the third and fourth card contact surfaces, wherein the alignment slot is positioned at a second position separate from the first position such that the alignment slot is configured to align with a card slide of the card payment system when the card payment system is cooperated with the frame.

Further embodiments provide methods of testing a card payment system, comprising: repeatedly causing a testing of a chip reader of the card payment system, comprising repeatedly: causing robotic holder, transporting a test payment card, to be positioned relative to a chip card slot of the card payment system; compensating for a first robotic alignment error comprising: directing the holder to cause the test payment card to contact a first card contact surface and a second card contact surface of a card chip guide of a card payment system support apparatus; and directing the test payment card toward the chip card slot while contacting and sliding along the first and second card contact surfaces, and causing the test payment card to be inserted into the chip card slot that is aligned with interior ends of the first and second card contact surfaces; and repeatedly causing a testing of a card strip reader of the card payment system, comprising repeatedly: causing the robotic holder to be positioned relative to a card slide of the card payment system; compensating for a second robotic alignment error comprising: directing the holder to cause the test payment card to contact at least one of a third card contact surface and a fourth card contact surface of a card strip guide of the card payment system support apparatus; and directing the test payment card toward the card slide while being aligned with the card slide by at least one of the third card contact surface and the fourth card contact surface, and causing the test payment card to be slid along the card slide.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus to support a card payment system during robotic testing, comprising:
a frame configured to cooperate with the separate card payment system;
a card chip guide secured with the frame, wherein the card chip guide comprises a first card contact surface and a second card contact surface, wherein the card chip guide is secured with the frame at a first position and configured to align with a card slot of the card payment system when the card payment system is cooperated with the frame; and
a card strip guide secured with the frame, wherein the card strip guide comprises third and fourth card contact surfaces and an alignment slot separating the third and fourth card contact surfaces, wherein the alignment slot is positioned at a second position separate from the first position and configured to align with a card slide of the card payment system when the card payment system is cooperated with the frame.

2. The apparatus of claim 1, wherein the card chip guide comprising:
a first cantilever extending generally away from the frame and comprising at least the first card contact surface defined along at least a portion of a length of the first cantilever.

3. The apparatus of claim 2, wherein the card chip guide comprising
a second cantilever extending generally away from the frame and comprising the second card contact surface defined along at least a portion of a length of the second cantilever.

4. The apparatus of claim 3, wherein the first cantilever is separated from the second cantilever by at least a robotic effector threshold distance and configured to enable robot effectors to move in-between the first cantilever and the second cantilever.

5. The apparatus of claim 4, wherein the first cantilever and the second cantilever extend away from the frame such that a distance between the first cantilever and the second cantilever increases further from the frame.

6. The apparatus of claim 3, wherein the card chip guide comprises:
a first guide wall extending from and defining an outer boundary of the first card contact surface; and
a second guide wall extending from and defining an outer boundary of the second card contact surface.

7. The apparatus of claim 1, wherein the card strip guide comprises a strip guide base and a first wall and a second wall extending from the strip guide base, wherein the first wall comprises the third card contact surface and the second wall comprises the fourth card contact surface positioned opposite the third card contact surface with the third card contact surface separate and spaced from the fourth card contact surface along a length of the third card contact surface.

8. The apparatus of claim 7, wherein the third card contact surface tapers toward the fourth card contact surface such that a width of a slide opening of the card strip guide is greater than a width of an alignment slot width of the card strip guide, wherein the slide opening of the card strip guide is further from the frame than the alignment slot of the card strip guide.

9. The apparatus of claim 7, wherein the strip guide base comprises a ramp surface that inclines along at least a portion of a length of the ramp surface such that a height of a slide opening height of the card strip guide is greater than a height of an alignment slot of the card strip guide, and wherein the slide opening of the card strip guide is further from the frame than the alignment slot.

10. The apparatus of claim 1, wherein a height of a strip card channel of the card strip guide defined between the third card contact surface and the fourth card contact surface is less than an effector threshold height, wherein the height of the strip card channel is greater further from the frame.

11. The apparatus of claim 1, further comprising:
a mounting plate comprising multiple mounting plate alignment structures and different mounting apertures configured to mate with multiple different types of card payment systems;
wherein the frame comprises alignment structures configured to align with the mounting plate alignment to align the frame with the mounting plate and a test card payment system when cooperated with the mounting plate.

12. The apparatus of claim 1, further comprising:
test robot system positioned proximate the frame, wherein the test robot system comprises a robotic holder configured to hold a test payment card, and a robot control systems configured to control the robotic holder and control movement of the robotic holder relative to the frame to cause the test payment card to be inserted into one of the chip card slot and the card slide.

13. The apparatus of claim 1, wherein the card chip guide comprises:
a first guide wall extending from and defining a boundary of the first card contact surface; and
a second guide wall extending from and defining a boundary of the second card contact surface, wherein a distance between the first guide wall and the second guide wall is greater further from the frame and proximate distal ends of the first guide wall and the second guide wall.

14. The apparatus of claim 13, wherein the card strip guide comprises a strip guide base, a first wall and a second wall, wherein the first wall and the second wall extend from the strip guide base; and
wherein the first wall comprises the third card contact surface and the second wall comprises the fourth card contact surface positioned opposite the third card contact surface with the third card contact surface separate and spaced from the fourth card contact surface along a length of the third card contact surface.

15. The apparatus of claim 14, wherein at least a portion of the first card contact surface is separated from at least a portion of the second card contact surface by at least a robotic effector threshold distance, and the first card contact surface and the second card contact surface extend away from the frame.

16. The apparatus of claim 14, wherein the strip guide base comprises a ramp surface that inclines along at least a portion of a length of the ramp surface such that a height of a slide opening height of the card strip guide is greater than a height of an alignment slot of the card strip guide, and wherein the slide opening of the card strip guide is further from the frame than the alignment slot; and
wherein each of the first card contact surface and the second card contact surface inclines along at least a portion of a length of the first card contact surface and the second card contact surface.

17. A method of testing a card payment system, comprising:
repeatedly causing a testing of a chip reader of the card payment system, comprising repeatedly:
compensating for a first robotic alignment error comprising: directing a robotic holder to cause a test payment card to contact at least one of a first card contact surface and a second card contact surface of a card chip guide of a card payment system support apparatus; and
directing the test payment card to sliding along the at least one of the first and second card contact surfaces, and causing the test payment card to be inserted into the chip card slot; and
repeatedly causing a testing of a card strip reader of the card payment system, comprising repeatedly:
compensating for a second robotic alignment error comprising: directing the robotic holder to cause a second test payment card to contact at least one of a third card contact surface and a fourth card contact surface of a card strip guide of the card payment system support apparatus; and
directing the test payment card along the at least one of the third card surface and the fourth card surface to be aligned with the card slide and slid into and along the card slide.

18. The method of claim 17, wherein the directing the test payment card toward the card slot comprises causing the robotic holder to move in-between a first cantilever comprising the first card contact surface and a second cantilever comprising the second card contact surface.

19. The method of claim 18, further comprising:
compensating for a first perpendicular robotic alignment error that is perpendicular to the first robotic alignment error through contact with at least one of a first guide wall and a second guide wall, wherein the first guide wall extends from and defines an outer boundary of the first card contact surface and the second guide wall extends from and defines an outer boundary of the second card contact surface.

20. The method of claim 19, further comprising:
compensating for a second perpendicular robotic alignment error that is perpendicular to the second robotic alignment error through contact with a ramp surface of a strip guide base, wherein the ramp surface inclines along at least a portion of a length of the ramp surface such that a slide opening height is greater than an alignment slot height.

* * * * *